Jan. 9, 1940.  H. C. LA MORE  2,186,301
UPHOLSTERED SEAT BACK STRUCTURE
Filed Feb. 3, 1939  2 Sheets-Sheet 1
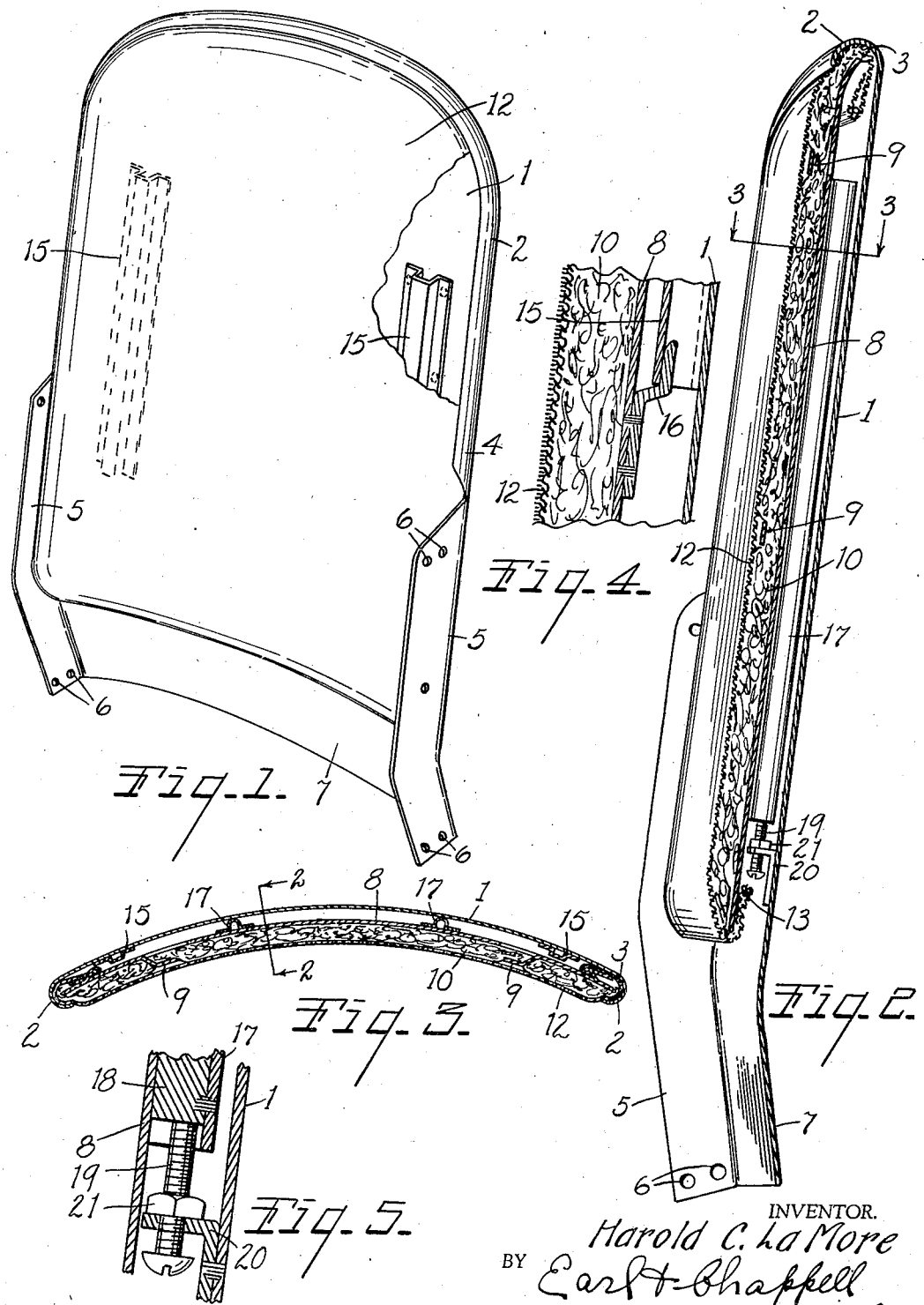
INVENTOR.
Harold C. La More
BY Earl F. Chappell
ATTORNEYS Jan. 9, 1940.  H. C. LA MORE  2,186,301
UPHOLSTERED SEAT BACK STRUCTURE
Filed Feb. 3, 1939   2 Sheets-Sheet 2

INVENTOR.
Harold C. La More
BY Earl D. Chappell
ATTORNEYS

Patented Jan. 9, 1940

2,186,301

UNITED STATES PATENT OFFICE 2,186,301

UPHOLSTERED SEAT BACK STRUCTURE

Harold C. La More, Grand Rapids, Mich., assignor to The Irwin Seating Company, Grand Rapids, Mich.

Application February 3, 1939, Serial No. 254,438

8 Claims. (Cl. 155—184)

This invention relates to improvements in upholstered seat back structure.

The main objects of this invention are:

First, to provide a back structure which is well adapted for theater and auditorium seats and the like, and one which, while attractive in appearance, permits ready removal of changing of the upholstery.

Second, to provide a seat back structure of this character in which the upholstery may be very quickly applied by relatively unskilled workmen.

Third, to provide a seat back structure which may be economically produced mainly of sheet metal stampings and at the same time one in which the parts are so arranged that they do not spring or buckle when made of light gage metal.

Further objects pertaining to details and economies of the invention will definitely appear from the description to follow. The invention is defined in the claims.

A structure embodying the features of the invention is clearly illustrated in the accompanying drawings, in which:

Fig. 1 is a front perspective view of a seat back structure embodying the features of my invention, parts being broken away and other normally concealed parts being indicated by dotted lines in order to show their relation in the structure.

Fig. 2 is an enlarged vertical section on line 2—2 of Fig. 3.

Fig. 3 is a horizontal section on line 3—3 of Figs. 2 and 6.

Fig. 4 is an enlarged fragmentary view on line 4—4 of Fig. 6.

Fig. 5 is an enlarged detail section on line 5—5 of Fig. 6.

Figure 6:
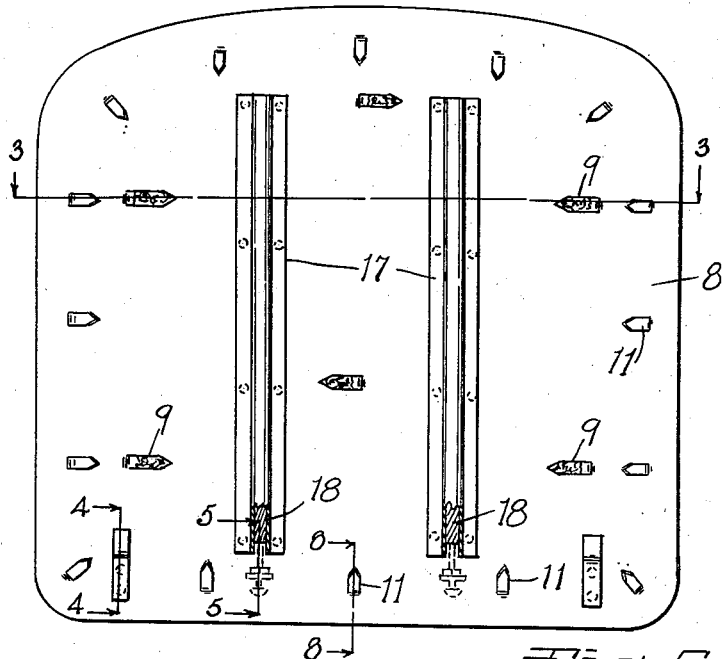
Fig. 6 is a rear elevation of the upholstery panel, parts being broken away to disclose structural details.
Figure 8:
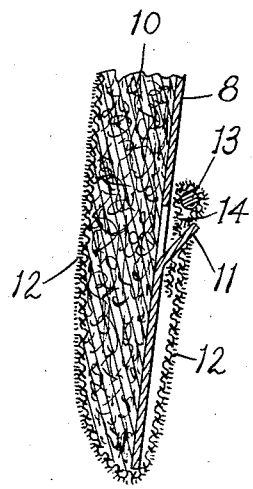
Fig. 8 is an enlarged fragmentary view on line 8—8 of Fig. 6 showing details of the securing means for the upholstery cover.
Figure 7:
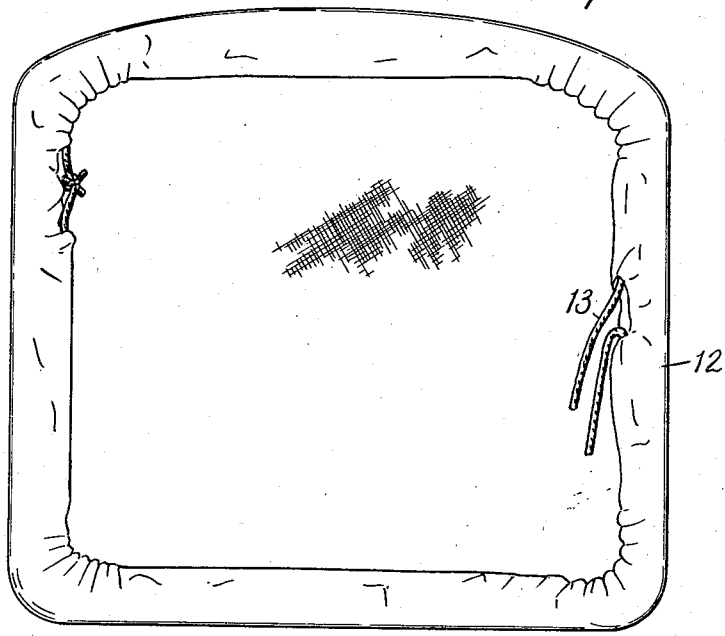
Fig. 7 is a rear view of the upholstery cover.

In the embodiment of my invention illustrated in the accompanying drawings, 1 represents a body member which is formed as a sheet metal stamping and is provided with a forwardly directed curved rim 2 extending across the top and downwardly along a substantial portion of the sides of the body member, providing an inwardly facing upholstery receiving channel 3 and a rounded finish surface. Below the side portions 4 of the rim the body member is provided with side flanges 5 adapted for attachment to the seat pedestal or other support, these flanges being provided with bolt-receiving holes 6.

It will be noted that the lower portion 7 of the body member is disposed at an angle to the upper portion so that the body supporting portion of the back is in the desired angular relation to the seat. The upholstery unit comprises a panel 8, also preferably a sheet metal stamping. This panel has tongue-like prongs 9 struck forwardly therefrom adapted to engage and position the padding 10 facilitating the upholstering steps. It is also provided with rearwardly struck prongs 11 adapted to engage the upholstery cover 12, the edges of which are drawn around the panel and the padding thereon, as is clearly shown in the drawings, and engaged on these prongs. The cover is provided with a beading cord 13 in its edges, this being preferably a draw cord arranged in a fold or pleat 14 so that after the edges are arranged around the panel the draw cord may be pulled up and tied as supplemental to the retaining prongs. When the upholstery unit is assembled in the body member or frame there is little stress on the means for securing the cover to the upholstery panel, and the draw string or cord in some structures is regarded as quite sufficient.

The body or frame member is provided with upright reinforcing channels 15, the lower open ends of which are adapted to receive the upwardly projecting lugs 16 on the upholstery panel. These reinforcing members add very materially to the rigidity of the body member or frame member, and it will be noted that they extend below the side portions of the rim which, in itself, serves as a stiffening element.

The upholstery panel is provided with upright reinforcing members 17 having fillers 18 in their lower ends which constitute thrust members for the screws 19 carried by brackets 20 welded to the body member. These screws have nuts 21 thereon disposed above the brackets so that by turning the screws the upholstery unit may be forced upwardly to clamp the edges thereof within the inwardly facing channel 3. This not only serves as a securing means for the upholstery but provides an effective closed joint between the parts and lends a finished appearance. It will be observed that the screws 19 are accessible from the lower end of the upholstery unit. In the event it is desired to change the upholstery covering, the upholstery unit may be quickly released and replaced, and the covering is attached to the upholstery panel so that the changes may be quickly effected.

A very important feature of the invention is that, while the completed structure has a finished attractive appearance, the upholstering work can be performed by others than skilled upholsterers. A further advantage is that the upholstery is very securely retained.

I have illustrated and described my improvements in an embodiment which I have found highly practical. I have not attempted to illustrate or describe other embodiments or adaptations which are possible as I believe the disclosure made will enable the adaptation of my invention as may be desired.

Having thus described my invention what I claim as new and desire to secure by Letters Patent is:

1. In a seat back structure, the combination of a body member having an integral forwardly directed rim extending across the top and downwardly along a substantial portion of the sides thereof providing an inwardly facing upholstery receiving channel, upright reinforcing members secured in spaced relation on the inner side of said body member, an upholstery unit comprising an upholstery panel having a plurality of upholstery cover retaining prongs struck rearwardly therefrom and a plurality of padding retaining prongs struck forwardly therefrom, spaced vertically disposed reinforcing members on the rear side of said panel, padding arranged on said panel in engagement with said padding retaining prongs, an upholstery cover drawn around the edges of said panel and engaged with said upholstery cover retaining prongs, said cover being provided with a beading cord at its edges, upwardly projecting lugs on said upholstery panel positioned to engage with the lower ends of said body member reinforcing members when said panel with the upholstery thereon is arranged with its edges in said rim channel, brackets on said body member alined with said reinforcing members on said upholstery panel, and screws carried by said brackets engaging the lower end of said panel reinforcing members for forcing the edges of said upholstery unit into said rim, said screws being accessible for adjustment from the lower end of said upholstery unit.

2. In a seat back structure, the combination of a body member having an integral forwardly directed rim extending across the top and downwardly along a substantial portion of the sides thereof providing an inwardly facing upholstery receiving channel, upright reinforcing members secured in spaced relation on the inner side of said body member, an upholstery unit comprising an upholstery panel, spaced vertically disposed reinforcing members on the rear side of said panel, an upholstery cover drawn around the edges of said panel secured thereto, upwardly projecting lugs on said upholstery panel positioned to engage with the lower ends of said body member reinforcing members when said panel with the upholstery thereon is arranged with its edges in said rim channel, brackets on said body member alined with said reinforcing members on said upholstery panel, and screws carried by said brackets engaging the lower end of said panel reinforcing members for forcing the edges of said upholstery unit into said rim, said screws being accessible for adjustment from the lower end of said upholstery unit.

3. In a seat back structure, the combination of a back member provided with an inwardly facing upholstery receiving channel extending across the top and downwardly along a substantial portion of the sides thereof, an upholstery unit comprising an upholstery panel having upholstery retaining prongs struck rearwardly therefrom and a plurality of padding retaining prongs struck forwardly therefrom, padding arranged on said panel in engagement with said padding retaining prongs, an upholstery cover drawn around the edges of said panel and engaged with said upholstery retaining prongs, upwardly projecting lugs on said upholstery panel, said body member being provided with parts with which said lugs may be engaged with an upward movement of the panel, and means disposed at the rear of said upholstery unit and accessible for adjustment from the lower end thereof for forcing the upholstery unit upwardly into said upholstery receiving channel.

4. In a seat back structure, the combination of a back member provided with an inwardly facing upholstery receiving channel extending across the top and downwardly along a substantial portion of the sides thereof, an upholstery unit comprising an upholstery panel having upholstery retaining prongs struck rearwardly therefrom, an upholstery cover drawn around the edges of said panel and engaged with said upholstery retaining prongs, upwardly projecting lugs on said upholstery panel, said body member being provided with parts with which said lugs may be engaged with an upward movement of the panel, and means disposed at the rear of said upholstery unit and accessible for adjustment from the lower end thereof for forcing the upholstery unit upwardly into said upholstery receiving channel.

5. In a seat back structure, the combination of a back member provided with an inwardly facing upholstery receiving channel extending across the top and downwardly along a substantial portion of the sides thereof, an upholstery unit comprising an upholstery panel, an upholstery cover drawn around the edges of said panel, upwardly projecting lugs on said upholstery panel, said body member being provided with parts with which said lugs may be engaged with an upward movement of the panel, and means disposed at the rear of said upholstery unit and accessible for adjustment from the lower end thereof for forcing the upholstery unit upwardly into said upholstery receiving channel.

6. In a seat back structure, the combination of a back member provided with an inwardly facing upholstery receiving channel extending across the top and downwardly along a substantial portion of the sides thereof, an upholstery unit comprising an upholstery panel, an upholstery cover drawn around the edges of said panel, said cover being provided with a draw cord in its edges, upwardly projecting lugs on said upholstery panel, said body member being provided with parts with which said lugs may be engaged with an upward movement of the panel, and threaded means disposed at the rear of said upholstery unit and accessible for adjustment from the lower end thereof for forcing the upholstery unit upwardly into said upholstery receiving channel.

7. In a structure of the class described, the combination of a body member provided with an inwardly facing upholstery receiving channel extending along the top and side edges of the body member, an upholstery panel, upholstery on said panel including a cover having its edges disposed around the edges of the panel, co-engaging means on said panel and body member engageable and disengageable with an upward movement of the panel acting to guide the top edges of the panel and upholstery into the top portion of said channel, and threaded means for forcing the top edge of the upholstery on the panel into the top portion of said channel and supporting the parts in their assembled position.

8. In a structure of the class described, the combination of a body member provided with an inwardly facing upholstery receiving channel extending along the top and side edges of the body member, an upholstery panel, upholstery on said panel, co-engaging means on said panel and body member engageable and disengageable with an upward movement of the panel acting to guide the top edge of the panel into the top portion of said channel, and means for forcing the top edge of the panel into the top portion of said channel and supporting the parts in their assembled position.

HAROLD C. LA MORE.